United States Patent

Chen et al.

Patent Number: 5,269,500
Date of Patent: Dec. 14, 1993

[54] METHOD AND APPARATUS OF THE CONICAL SPRING

[76] Inventors: Feichu H. Chen; Haw-Renn Chen, both of 4057 Little Hollow Pl., Moorpark, Calif. 93021

[21] Appl. No.: 519,923

[22] Filed: May 7, 1990

Related U.S. Application Data

[60] Division of Ser. No. 346,347, May 1, 1989, which is a continuation of Ser. No. 174,113, Mar. 28, 1988, abandoned.

[51] Int. Cl.$^5$ ............................................. F16F 1/08
[52] U.S. Cl. .................................................. 267/166.1
[58] Field of Search ............... 188/267; 267/159, 161, 267/162, 166.1, 167, 164; 411/368, 369, 544, 916, 392, 147, 150, 152, 153; 184/14.1; 335/302; 310/90.5

[56] References Cited

U.S. PATENT DOCUMENTS

| | | | |
|---|---|---|---|
| 106,328 | 8/1870 | Moore | 267/167 X |
| 1,115,664 | 10/1915 | Lambert | 411/368 X |
| 1,215,904 | 2/1917 | Brown | 184/14.1 |
| 1,295,937 | 3/1919 | Stafford et al. | 411/368 |
| 1,805,242 | 5/1931 | Grus, Jr. | 184/14.1 |
| 2,417,715 | 3/1947 | Stewart | 267/162 |
| 2,515,629 | 7/1950 | Chambers, Jr. | 267/167 |
| 2,779,647 | 11/1957 | Hamm | 267/167 X |
| 3,313,552 | 4/1967 | McElya et al. | 267/161 X |
| 3,430,942 | 3/1969 | Webb | 267/162 |
| 3,503,430 | 3/1970 | Tsurumoto | 411/147 |
| 3,733,958 | 5/1973 | Willey | 411/544 X |
| 3,976,339 | 8/1976 | Sabnis | 310/90.5 |
| 4,040,681 | 8/1977 | van der Heide | 310/90.5 |
| 4,285,054 | 8/1981 | McNeel | 267/161 X |
| 4,574,616 | 3/1986 | Miura et al. | 267/158 X |
| 4,679,775 | 7/1987 | Funaki et al. | 188/261 X |
| 4,765,600 | 8/1988 | Hü/a/rtel | 188/267 X |
| 4,910,633 | 3/1990 | Quinn | 310/90.5 X |
| 4,983,870 | 1/1991 | McSparran | 310/90.5 |

FOREIGN PATENT DOCUMENTS

| | | | |
|---|---|---|---|
| 635155 | 11/1963 | France | 267/160 |
| 408444 | 4/1943 | Italy | 267/161 |
| 103129 | 8/1980 | Japan | 267/164 |

*Primary Examiner*—Robert J. Oberleitner
*Assistant Examiner*—Peter M. Poon

[57] ABSTRACT

A conical spring is a universal spring that comprises a load applying component, formed to have an appropriate geometrical configuration with interfacing surface symmetrical to a predetermined axis, and a load absorbing component, being able to vary dimension radially when a load is applied and formed to have a surface matching to the interfacing surface of the load applying component, thereby the interfacing surface of the load applying component and the matching surface of the load absorbing component are to contact with each other when a load is applied axially between the load applying component and the load absorbing component to have the radial dimension of the load absorbing component vary thereof to absorb the energy generated by the axial load and to generate an axial force reacting to the applied load. Frictionless or low friction media can be added to the contacting surface to achieve low friction purpose.

5 Claims, 1 Drawing Sheet

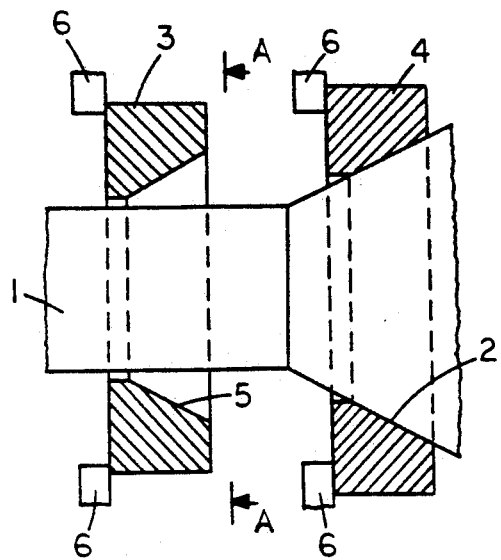
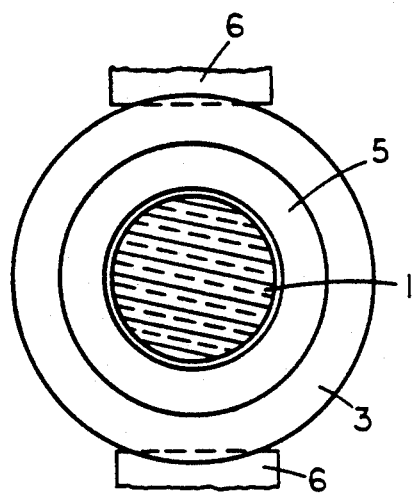
FIG. 1
FIG. 2
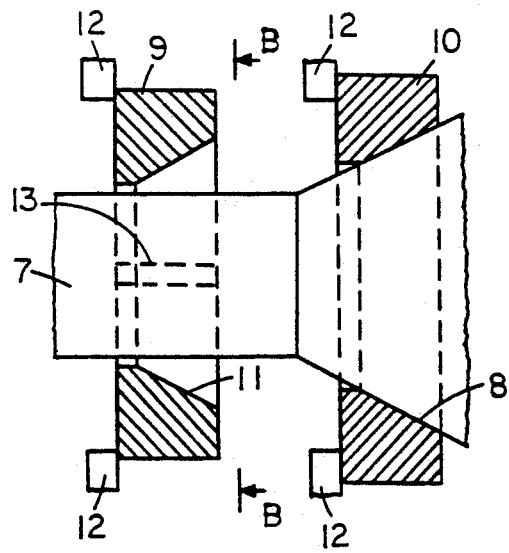
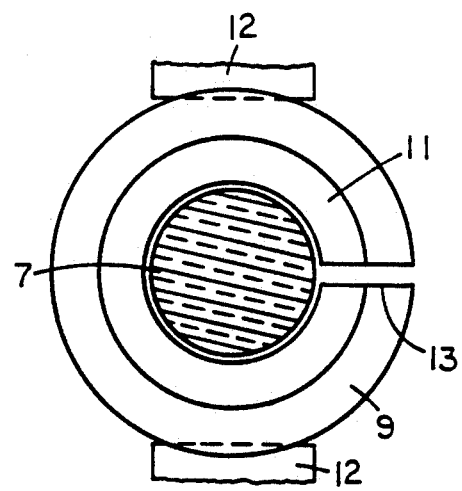
FIG. 3
FIG. 4

METHOD AND APPARATUS OF THE CONICAL SPRING

This is a division of Ser. No. 346,347, filed May 1, 1989, which was a continuation of Ser. No. 174,113, filed Mar. 28, 1988, now abandoned.

BACKGROUND OF THE INVENTION

Springs are employed to exert forces or torques in a mechanism or to absorb energy of suddenly applied loads. Depending upon the configuration, the conventional spring has a number of types, such as helical springs, leaf springs, Belleville springs, disk springs, spiral springs, ring springs, volute springs, and so on. A conventional spring can normally be used to provide a load which varies continuously as a function of the spring deflection. It is difficult to use a conventional spring in applications requiring disengagement of certain spring components due to the fact that the spring components are physically stacked in parallel or in series. With a system already being set up, conventional spring parts are difficult to be modified or changed without altering the original configuration or layout of the system installed with springs. Also, it is extremely difficult for any conventional spring to be a contactless spring, to have certain ranges of spring deflection being free of loading, or to have discontinued piecewise deflection rate variation.

OBJECTS AND ADVANTAGES OF THE INVENTION

Accordingly, the present invention is used to enhance the utilization of a spring means in wider application area and to solve the problems that certain designs and applications are difficult to be achieved through the utilization conventional springs. There are various of advantages by utilizing the present invention over currently available conventional springs as follows:

1) The present invention can be made to have discontinued deflection ratio from section to section along certain or whole range of spring deflection.

2) The present invention can allow the load applying means to move freely, without being loaded, at appropriate deflection ranges.

3) One or more sections of the present invention can be allowed to be disengaged from a string of springs without altering the system installed with the springs.

4) The functions of the present invention can be easily modified or changed without altering any configuration or structure of the original system applying the spring.

5) A contactless spring can be economically manufactured and assembled through the design concept of the present invention.

6) The present invention can be made to have piecewise deflection ratio along certain or whole range of the spring deflection.

Therefore, the primary object of the present invention is to provide a spring that is versatile and can be utilized conveniently, economically, and effectively at all situations.

BRIEF DESCRIPTION OF THE INVENTION

The novel features of the present invention may be better understood from the accompanying description when taken in conjunction with the accompanying drawings in which like characters refer to like parts and in which:

FIG. 1 illustrates a cross-sectional sideview of a conical spring with expandable hollowed columns as the load absorbing means;

FIG. 2 illustrates a cross-sectional view of the conical spring along plane AA in FIG. 1;

FIG. 3 illustrates a cross-sectional sideview of a conical spring with disks having opening cut as the load absorbing means;

FIG. 4 illustrates a cross-sectional view of the conical spring along plane BB in FIG. 3;

DESCRIPTION OF THE EMBODIMENT AND OPERATION

A conical spring (C-spring) comprises load applying means and load absorbing means. The load applying means has the geometrical configuration that contains an interfacing surface, being linear or nonlinear conical surface, formed to be symmetrical around an axis and the angle between the interfacing surface and the axis is preferably acute (less than 90 degrees). The load absorbing means has the geometrical configuration that has the properties of elastical flexibility along the radial directions and contains a matching surface symmetrical around an axis, with appropriate surface contours matching to the interfacing surface on the load applying means.

FIG. 1 and FIG. 3 illustrate the cross-sectional side views of a C-spring in which the load applying means are indicated by 1 and 7, the load absorbing means are indicated by 3, 4, 9, and 10. Each of the load applying means 1 and 7 is a solid column with properly formed external interfacing surface. The load absorbing means 3 and 4 are expandable hollowed columns with an internal matching surface 5 matching to the external interfacing surface of the load applying means 1, as illustrated in FIG. 1 and in FIG. 2 of the patent application with Ser. No. 763,499 filed on Sep. 23, 1991. The load absorbing means 9 and 10 are disks with opening cut 13 having an internal matching surface 11 matching to the external interfacing surface of the load applying means 7, as illustrated in FIG. 3.

The load applying interfacing means as indicated by 2 in FIG. 1 and indicated by 8 in FIG. 3 are structures or means inbetween the load applying means and the load absorbing means to transfer the load energy from the load applying means 1 to the load absorbing means 3 and/or 4 and from the load applying means 7 to the load absorbing means 9 and/or 10. A load absorbing guidance means 6 can be used to guide the load absorbing means 3 and 4 to move relatively to the load applying means 1. A load absorbing guidance means 12 can be used to guide the load absorbing means 9 and 10 to move relatively to the load applying means 7.

As illustrated in FIG. 1 and FIG. 3, the load applying interfacing means 2 and 8 comprise a thin structure or a contacting surface, between the interfacing surface of the load applying means and the matching surface of the load absorbing means, formed symmetrically around a predetermined axis of the load applying means and the load absorbing means. If a load is applied on the load applying means 1 or 7, the load applying means 1 or 7 will move leftwards, as illustrated in FIG. 1 and FIG. 3, relatively to the load absorbing means 3 and 4 or 9 and 10 respectively. After the load applying means 1 or 7 is in contact with the load absorbing means 3 and/or 4 or 9 and/or 10 respectively, 3 and 4 or 9 and 10 will be expanded in sequence by 1 or 7 respectively, through the load applying interfacing means 2 or 8 respectively, due to the restriction on the axial movement of the load absorbing means 3 and 4 or 9 and 10 by the load absorbing guidance means 6 or 12 respectively. As the load absorbing means 3 and/or 4 or 9 and/or 10 are expanded, the load energy is absorbed and a force generated by the load absorbing means 3 and/or 4 or 9 and/or 10 normal to the load applying interfacing means 2 or 8 is applied on 1 or 7 respectively. Since the radial components of the force are symmetrical and equilibrium, a net force is applied on 1 from 3 and/or 4 axially or on 7 from 9 and/or 10 axially as a reaction force to balance the load applied on 1 or 7 respectively.

An illustration of the cross-sectional view of the C-spring along plane AA in FIG. 1 is depicted in FIG. 2. As illustrated in FIG. 2, the load absorbing means, 3, can be formed as a ring with an internal matching surface 5 when expandable or appropriately flexible substance is used for the ring. An illustration of the cross-sectional view of the C-spring along plane BB in FIG. 3 is depicted in FIG. 4. As illustrated in FIG. 4, the load absorbing means, 9, can be formed as a ring with an opening cut 13 having an internal matching surface 11 when a rigid or nonflexible substance or material is used for the ring.

The number of the elements of the load absorbing means to be installed on the C-spring can be as many as needed. Also, the spacing between the load absorbing means can be adjusted to fit various design requirements and needs. For example, when proper spacing is placed among load absorbing means 3 and 4 in FIG. 1 or 9 and 10 in FIG. 3, the load applying means 1 or 7 and the load absorbing means 3 and/or 4 or 9 and/or 10 can move relatively free without any energy transferred from the load applying means 1 or 7 to the load absorbing means 3 and/or 4 or 9 and/or 10 respectively within specific spring deflection ranges. When more than one elements of load absorbing means, each element having various rigidities or elasticities, are used, the C-spring can have the property of piecewisely variable spring constant along the direction of the spring deflection.

Furthermore, the friction between the load applying means and the load absorbing means of a C-spring can be reduced to reduce the generated heat during a frequently alternating load or to enhance the spring efficiency by forming a thin layer of zone having the properties of low internal friction along the direction of contacting surfaces. The low friction zone can be formed by having it filled with magnetic field to generate electromagnetic interaction force between the load applying means, 1 or 7, and the load absorbing means, 3 and 4 or 9 and 10 respectively. The magnetic field is generated by the magnetic material on the load applying means or the load absorbing means. The low friction zone can also be formed by having it filled with high pressure gas phase substance.

CONCLUSION, RAMIFICATIONS, AND SCOPE

Accordingly, it can be seen that the C-spring has a number of advantages over known conventional spring means as mentioned previously. Furthermore, the C-spring has the additional advantage in that
. it makes certain design which is difficult or complex to be achieved through the known prior art springs be feasible, such as the application of the C-spring utilized in the Ser. No. 824,882 filed Jan. 24, 1992 by the inventors of the invention.

Although the above detail description contains many specifications, these should not be construed as limiting the scope of the invention but merely providing illustrations of some of the presently preferred embodiments of this invention. For example, the shape of the load applying means and the load absorbing means is not limited to the linear conical column; the number of the load absorbing means to be installed can be more than two; the load applying means can be a hollowed column with internal interfacing surface accompanied by the load absorbing means having a matching external interfacing; and so forth. Thus, the scope of the invention should be determined by the appended claims and their legal equivalent, rather than by the example given.

I claim:

1. An enhanced conical spring comprising a load applying means having a geometrical configuration with an interfacing surface symmetrically formed at predetermined location and orientation around an axis, load absorbing means having an elastically flexible geometrical configuration with a matching interfacing surface formed to match said interfacing surface of said load applying means, at least one of said interfacing surface on said load applying means and said matching interfacing surface on said load absorbing means made of magnetic material, and guide means guiding said load absorbing means and said load applying means to move relative to one another, said interfacing surfaces filled with an electromagnetic field.

2. An enhanced conical spring as set forth in claim 1 wherein said enhanced conical spring contains multiple load absorbing means.

3. An enhanced conical spring as set forth in claim 1 wherein said enhanced conical spring contains multiple load absorbing means with various rigidities enabling said conical spring to have piecewisely variable spring constants thereon.

4. An enhanced conical spring as set forth in claim 1 wherein said load absorbing means comprises a ring made of a flexible substance.

5. An enhanced conical spring as set forth in claim 1 wherein said load absorbing means comprises a ring with an opening cut.

* * * * *